United States Patent [19]

Johnson, Jr.

[11] 4,072,367

[45] Feb. 7, 1978

[54] NOISE REDUCING INSERTS FOR SPINDLE TAPE IDLERS

[75] Inventor: Joe Johnson, Jr., Powder Springs, Ga.

[73] Assignee: Coats & Clark Inc., Stamford, Conn.

[21] Appl. No.: 744,714

[22] Filed: Nov. 24, 1976

[51] Int. Cl.² .............................................. F16C 35/04
[52] U.S. Cl. .................................. 308/18; 308/189 R; 308/195
[58] Field of Search .......... 308/18, 15, 189 R, 189 A, 308/195, 22; 248/18; 74/230.01; 112/242, 243; 242/118, 129.6, 129.62, 134, 129.7; 179/146 R

[56] References Cited

U.S. PATENT DOCUMENTS

| 2,760,378 | 8/1956 | Deventer | 308/18 X |
| 3,107,947 | 10/1963 | Hulterstrum | 308/18 X |
| 3,295,801 | 1/1967 | McDowall et al. | 308/15 X |

Primary Examiner—Trygve M. Blix
Assistant Examiner—Douglas C. Butler
Attorney, Agent, or Firm—Burgess, Ryan and Wayne

[57] ABSTRACT

A tape idler for textile machinery includes a pulley, and a rolling bearing pressfit into the pulley. A pair of plastic rods are close fitted into the inner race of the bearing, from opposite sides thereof, and the assembly is held together by a bolt extending through the rods. A pair of resilient sleeves are close fit on the ends of the rods, and adapted to be pressed into the mounting slots of a conventional idler pulley assembly.

8 Claims, 7 Drawing Figures

U.S. Patent    Feb. 7, 1978    4,072,367
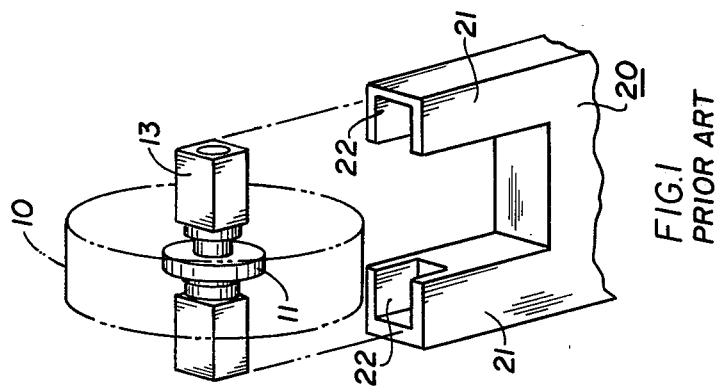
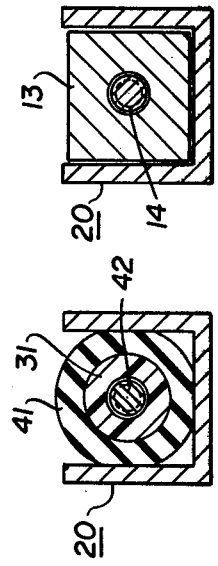
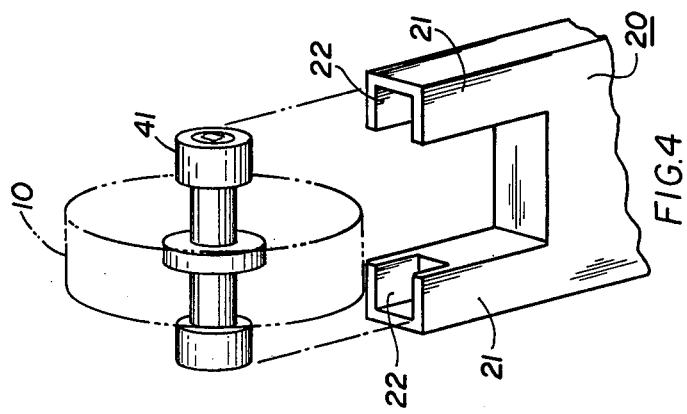
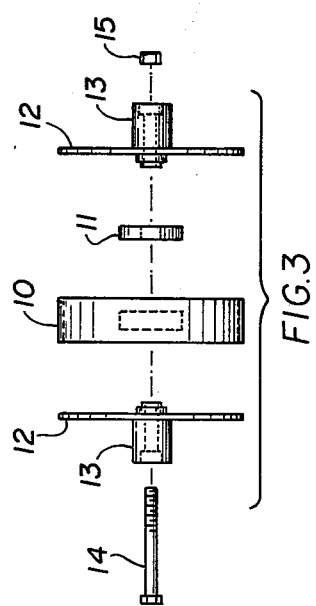
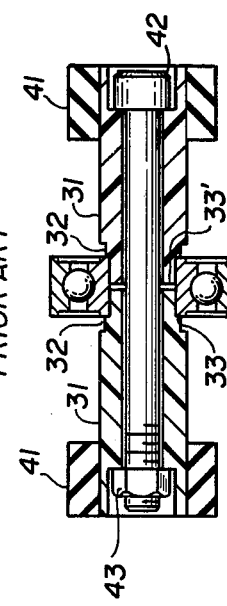
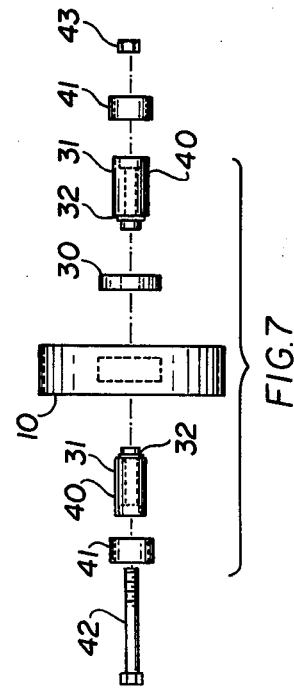

NOISE REDUCING INSERTS FOR SPINDLE TAPE IDLERS

BACKGROUND OF THE INVENTION

This invention relates to noise reduction devices for textile machinery, and is particularly directed to the reduction of noise which results from the mounting of tape idlers in the textile machinery.

In known textile machinery, spindle tapes that drive the machinery spindles are directed over idler pulleys of a type known as Meadows tape idlers. In tape idlers of this type, the support for the idlers is comprised of a bracket having a pair of spaced apart square mounting slots. The pulley assembly itself was comprised essentially of a pair of plates on the sides of a rotatable pulley wheel, with a bearing held between the plates for rotatably supporting the pulley wheel. Square bosses or projections were provided on the plates, the projections being adapted to fit into the square slots of the brackets. The assembly of the two plates with their square projections, and the bearing between the plates, was held together by a central axially extending bolt.

These pulley assemblies are functionally satisfactory, and are known to give many years of service. They do present a problem, however, of introducing noise into the textile machinery room. For example, since the brackets and the plates with their square projections were metal, and since a loose fit was provided between these elements, the metal to metal contact resulted in the generation of noise. In addition, the cover plates, which fit adjacent to but do not touch the revolving pulley, act as resonators to magnify any noise that is generated.

While the noise generated by any single tape idler may not be excessive, the processing rooms, for example, for the production of thread or yarn, may contain hundreds or thousands of such tape idlers. As a consequence, the overall noise produced by the tape idlers may be very great. It is not unusual, in mills included in such tape idlers, for the noise levels in a room to exceed 90db.

There are of course many well known noise reducing techniques, and modern textile equipment may readily be designed to take advantage of such techniques, to reduce the room noise levels to tolerable values. The useful life of textile machinery, such as thread and yarn spinning frames and the like, is quite long, however, so that full replacement of the equipment is neither economically justified nor warranted.

There has been recent interest in the reduction of noise level in factories, from the standpoint of safety and health, and standards have been established with respect to the length of time that a worker may be present in a room at given noise levels. The noise level in the rooms of a textile mill has been adequately high in the past, that workers were not permitted to spend full working days in the rooms, without earmuffs or the like. This is of course undesirable from a standpoint of operating and maintaining the equipment, since, particularly, with less modern equipment, manual operation such as doffing and donning may be required. The solution of requiring the workers to wear earmuffs has not been found to be satisfactory or acceptable to the workers.

The present invention is therefore directed to the provision of noise reduction means, for reducing the above described spindle noise in textile machines. While the invention is particularly directed to the provision of noise reducing means that may readily and economically be employed on existing equipment, it will of course be apparent that the invention contemplates the application of the same concept to new equipment, if desired.

Briefly stated, in accordance with the invention, tape idlers of the above type are modified, without requiring modification of the brackets. In accordance with the invention, the plates on the pulley assemblies are replaced by plastic rods which engage the sides of the bearing. The diameters of the rods are less than the minimum dimension of the square slots in the brackets, and a bolt is provided extending through the rods and the bearing, to hold these elements together. In addition, a resilient sleeve, for example, of rubber, is provided at the axially outer end of the rods, the sleeves having diameters such that the axial ends of the assembly may be readily forced into the square slots. In this arrangement, the bearing is preferably force fit into the pulley wheel itself, and the pulley may be identical to the pulleys that had previously been employed.

As a result of such modification of the tape idler pulleys, metal to metal contact at the bracket is avoided, and this source of noise is hence removed. In addition, since the plates themselves are no longer employed, this source of noise is also removed.

In a particularly advantageous embodiment of the invention, a kit is provided including those parts which, as a minimum, should be replaced in order to reduce the noise generated by the tape pulley assembly. Specifically, the kit includes two plastic rods and the resilient sleeves adapted to fit over the rods, and be in turn fit into the bracket slots. These rods and sleeves replace the end plates of the previously employed pulley assemblies. In addition, a new bearing may be provided, as well as a bolt for holding these elements together. It has not been found generally necessary to replace the pulley wheel itself, since such pulley wheels, especially if they are plastic, will generally not need replacement.

In order that the invention will be more clearly understood, it will now be disclosed in greater detail, with reference to the accompanying drawings, wherein:

FIG. 1 is a perspective view of a known tape idler pulley assembly;

FIG. 2 is a cross sectional view of the tape idler pulley assembly of FIG. 1, shown in position in a bracket;

FIG. 3 is an exploded view of the tape idler pulley assembly of FIG. 1;

FIG. 4 is a perspective view of a tape idler pulley assembly in accordance with the invention;

FIG. 5 is a cross sectional view of the tape idler pulley assembly of FIG. 4, in the bearing region thereof;

FIG. 6 is a longitudinal cross sectional view of the tape idler pulley assembly of FIG. 4; and FIG. 7 is an exploded view of the tape idler pulley assembly of FIG. 4.

Referring now to the drawings, and more in particular to FIGS. 1-3, therein is illustrated a known form of a tape idler pulley assembly. The tape idler pulley assembly is comprised generally of a pulley wheel 10 having a central web for receiving a bearing, such as the ball bearing 11 shown in FIG. 3. The pulley itself may be of a plastic material. A circular plate 12 is provided on each side of, and enclosing the sides of, the pulley 10. A coaxial square boss 13 is provided on each plate 12, on the sides thereof facing away from the pulley. This assembly is held together by a bolt 14 extending through the square boss 13, the plates 12, and the bearing 11, the bolt 14 being provided with a suitable nut 15. The head of the bolt, as well as the nut, are located in recesses in the square bosses in the assembled state of the idler assembly.

As illustrated in FIGS. 1 and 2, the pulley assembly is adapted to be mounted in a bracket 20 having a pair of spaced apart arms 21, each of the arms 21 having an open slot or socket 22 at its upper end. The slots 22 have generally square cross sections. As illustrated more clearly in FIG. 2, the tape idler pulley assembly is mounted in position merely by inserting the square boss thereof into the corresponding square boss section slot of the bracket. This form of mounting of the tape idler pulley assembly is quite convenient, since it merely requires insertion of the pulley assembly, for example, from above, into the corresponding slots of the brackets.

While the tape idler pulley assembly of FIGS. 1-3 functions generally satisfactory in textile machinery, it has to a disadvantage that it generates an extensive amount of noise. For example, since the bosses 13 and bracket 20 are of metal, and since the bosses 13 are relatively loose fitting in their respective slots, the metal to metal contact between these elements may result in the generation of noise. In addition, since the plates 12 are not restrained at their outer ends, but merely extend radially from the rotating axis of the assembly, these plates may serve as resonators to magnify any noise that is generated by the bearing.

In the improved idler pulley assembly of the present invention, as illustrated in FIGS. 4-7, the bearing, such as ball bearing 30, is press fit in the web of the pulley 10. The pulley 10 may be the same pulley that had been employed in the known arrangement of FIGS. 1-3, and may be of a plastic material.

The pulley assembly of the invention is further comprised of a pair of plastic rods, for example, molded nylon rods 31. The rods 31 are arranged on opposite sides of the bearing 30, and have reduced diameter ends 32 toward the bearing 30, whereby the ends of the rods 31 may be closely fit into the inner rings of the bearing. The smaller diameter end portions 32 have lengths, in the axial direction of the respective rods, that are less than half the thickness of the bearing, and these reduced diameter end portions 32 defines shoulders 33 which engage the sides of the inner race of the bearing, as it appears in FIG. 6. As a consequence, the end faces 33' of the rods within the inner race are spaced apart, as is shown in FIG. 6, in the assembled state of the bearing assembly.

The other ends 40 of the nylon rods have diameters less than the cross dimension of the slots 22 of the brackets, and resilient sleeves, such as the rubber sleeves 41 are fitted over these ends of the rods. The ends of the rods away from the bearing 30 are recessed, and a bolt 42 is provided extending through the assembly, with a nut 43 being provided on the threaded end of the bolt. The head of the bolt and the nut are of course positioned in the corresponding recesses in the ends of the rods 31. The central axially extending holes in the rods of course have diameters adequate to receive the bolt 42.

As is more clearly illustrated in FIG. 5, the pulley assembly in accordance with the invention is mounted, i.e. assembled in the bracket, by pressing the ends of the rods 31, with their rubber sleeves 41, into the spaced apart slots 22. In so mounting the assembly, the rubber of the sleeves 42 is of course slightly deformed, so that the rods, and hence the pulley assembly, are resiliently held in the slots of the bracket. With this type of mounting, since there is no metal to metal contact, and since the resilient sleeve is provided, any noise generation is prevented, or drastically reduced. In addition, since the plates are not provided on the pulley assembly, as in the prior art arrangement, there is no resonating action that will amplify noise.

As a consequence, it has been found that pulley assemblies of the type illustrated in FIGS. 4-7, when employed as substitutes for the pulley assembly of FIGS. 1-3, may result in a noise reduction in a textile machinery room of up to 4db. This reduction of course assumes that overriding noises in the textile machinery room are not present.

The tape idler pulley assembly of the invention provides the further advantage that it may be readily and economically fabricated for use in existing equipment. For example, noise reduction kits may be provided including the rods 31, sleeves 41, bearing 30, and bolt and nut assembly 42/43. It is not necessary to replace the pulleys, since in the mounting arrangement in accordance with the invention, there is substantially no noise generated even though the existing pulley wheel is employed. It will be noted that replacement of the roller bearing is generally necessary, however, in view of the new form of mounting, to insure stability of the structure.

While the invention has been disclosed and described with reference to a single embodiment, it will be apparent that variations and modifications may be made therein, and it is intended in the following claims to cover each such variation and modification as falls within the true spirit and scope of the invention.

What is claimed is:

1. A tape idler pulley assembly adapted to be supported in open mounting slots, comprising a pulley, a rolling bearing having a radially outer race press fit in said pulley and an inner race, a pair of plastic rods having first ends close fitted in the inner race of said bearing from opposite sides thereof, and a pair of resilient sleeves close fit around the other ends of said rods, said sleeves having a diameter requiring deformation thereof for insertion in said mounting slots.

2. The tape idler pulley assembly of claim 1 wherein said rods are of nylon and said resilient sleeves are of rubber.

3. The tape idler pulley assembly of claim 1 wherein said plastic rods are identical.

4. The tape idler pulley assembly of claim 1 wherein said rods have central holes axially extending therethrough, further comprising bolt means extending through said rods for holding said rods and bearing together.

5. The tape idler pulley assembly of claim 4 wherein said rods have shoulders engaging end faces of said inner race of said bearing.

6. A kit for reducing the noise produced by a tape idler pulley assembly adapted to be mounted in open rectangular slots, said assembly having a pulley, first and second cover plates on opposite sides of the pulley, each cover plate having a rectangular projection adapted to fit one of said slots, and a rolling bearing held between said plates for rotatably supporting said pulley, said kit comprising a pair of plastic rods, and a pair of resilient sleeves having inner dimensions to closely fit said rods and outer dimensions to closely fit into said slots, whereby said sleeves and rods serve as replacements for said plates.

7. The kit of claim 6 further comprising a bearing for replacing said first mentioned bearing, said last mentioned bearing having an outer diameter for being press fit in said pulley.

8. The kit of claim 6 wherein said rods have central axial holes extending therethrough and further comprising a bolt of a length to hold said rods and bearing together.

* * * * *

UNITED STATES PATENT OFFICE
CERTIFICATE OF CORRECTION

Patent No. 4,072,367      Dated February 7, 1978

Inventor(s) Joe Johnson, Jr.

It is certified that error appears in the above-identified patent and that said Letters Patent are hereby corrected as shown below:

Column 3, line 21: Cancel "to".

Signed and Sealed this

Eleventh Day of July 1978

[SEAL]

Attest:

RUTH C. MASON
*Attesting Officer*

DONALD W. BANNER
*Commissioner of Patents and Trademarks*